United States Patent [19]

Beltrop et al.

[11] 4,395,164
[45] Jul. 26, 1983

[54] PNEUMATIC TUBE INSTALLATION FOR POSTING SAMPLES OF MATERIAL

[75] Inventors: Herbert Beltrop, Hamm; Josef Teutenberg, Beckum; Manfred Hilbig, Neubeckum, all of Fed. Rep. of Germany

[73] Assignee: Krupp Polysius AG, Fed. Rep. of Germany

[21] Appl. No.: 267,800

[22] Filed: May 28, 1981

Related U.S. Application Data

[63] Continuation of Ser. No. 133,982, Mar. 26, 1980, abandoned, which is a continuation-in-part of Ser. No. 907,009, May 18, 1978, abandoned.

[30] Foreign Application Priority Data

May 20, 1977 [DE] Fed. Rep. of Germany ....... 2722865

[51] Int. Cl.³ .............................................. B65G 51/26
[52] U.S. Cl. ...................................... 406/74; 406/112
[58] Field of Search .................... 406/52, 62, 63, 74, 406/111, 112, 147, 176, 179, 182, 189; 222/447, 450

[56] References Cited

U.S. PATENT DOCUMENTS

| 887,608 | 5/1908 | Duflon | 406/74 X |
| 3,599,898 | 8/1971 | Bontempelli | 406/74 X |
| 3,762,664 | 10/1973 | Loveless | 406/182 |
| 4,066,107 | 1/1978 | Karp et al. | 222/447 X |

FOREIGN PATENT DOCUMENTS

| 2410984 | 9/1974 | Fed. Rep. of Germany | 406/112 |
| 2420459 | 10/1975 | Fed. Rep. of Germany | 406/112 |

*Primary Examiner*—Jeffrey V. Nase
*Attorney, Agent, or Firm*—Learman & McCulloch

[57] ABSTRACT

A pneumatic-type installation for posting samples of fine material comprises at least one sample despatch station for filling, sealing and despatching sample carriers, a sample receiving station for receiving, emptying and returning the sample carriers to the sample despatch station and a pneumatic tube system connecting the sample despatch and receiving stations. When a carrier arrives at the receiving station it automatically is opened, emptied, reclosed, and readied for return to the despatch station at which it automatically is conditioned to receive a fresh sample.

6 Claims, 12 Drawing Figures

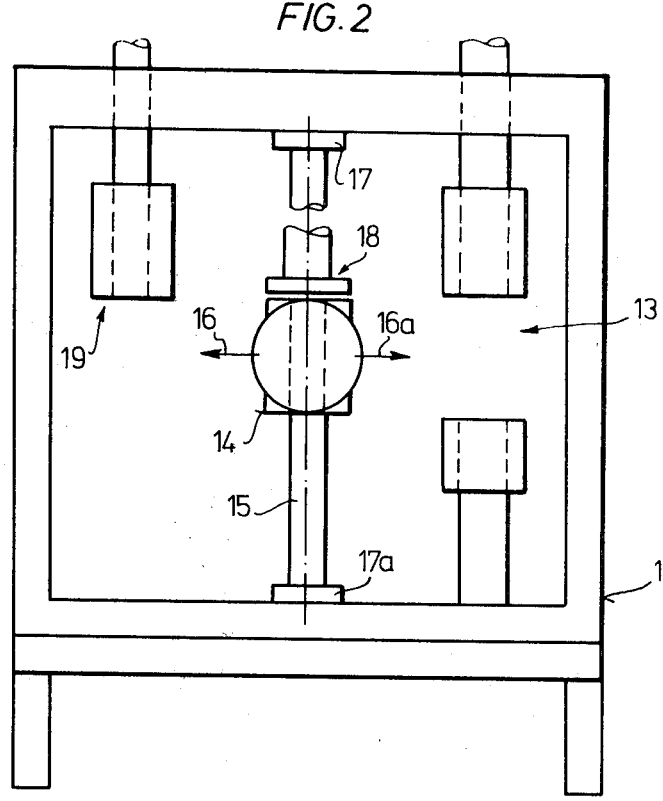
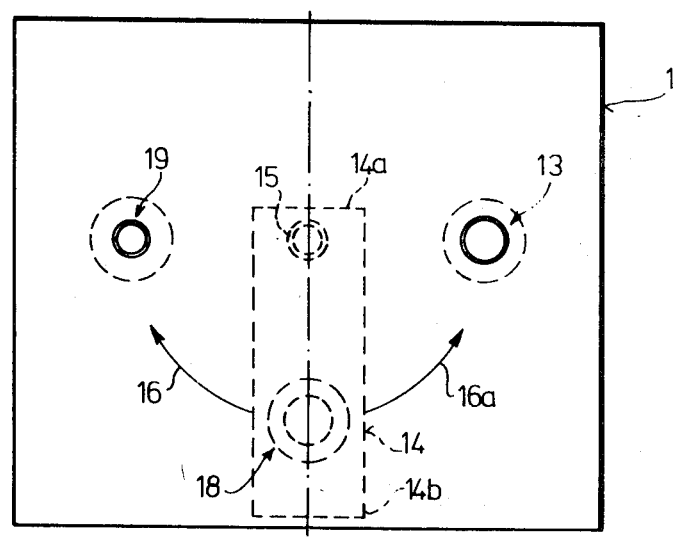

PNEUMATIC TUBE INSTALLATION FOR POSTING SAMPLES OF MATERIAL

RELATED APPLICATION

This application is a continuation of application Ser. No. 133,982, filed Mar. 26, 1980, now abandoned, which is a continuation-in-part of application Ser. No. 907,009, filed May 18, 1978, now abandoned.

BACKGROUND OF THE INVENTION

Known pneumatic tube installations of the type to which the invention relates generally are constructed in such a way that the sample despatch station is set up at and connected to the sampling facility (with sampler, sample mixer and metering unit) of a production plant, while the sample receiving station is set up at the sample processing facility, usually in a laboratory. The sample despatch station and the sample receiving station are connected to one another for delivery on the one hand by a vacuum delivery line and on the other hand by a compressed air delivery line, an air blower being associated with each of these two delivery lines. It is of course also possible for several sample despatch stations (distributed throughout the production plant) to be connected to the sample receiving station in the same way. Major disadvantages of this known construction include the fact that the expense which it involves in terms of delivery lines and the energy required for operating them is considerable, and the fact that both the sample despatch station and also the sample receiving station have to be connected to both delivery lines to ensure, on the one hand, the delivery of full sample carriers and, on the other hand, the return of empty sample carriers to the corresponding sample despatch station.

SUMMARY OF THE INVENTION

An object of the present invention is to provide a pneumatic tube installation of the type referred to above which is distinguished from the known construction both by a simplified tube system and by a structural simplification of the sample despatch and receiving stations while, at the same time, providing for reliable, fully automatic operation.

According to the invention, this object is achieved in that the tube system contains a single delivery tube which is operable in both delivery directions by means of a single blower, which can be switched over to vacuum or pressure delivery, and two non-return valves.

Comparison of a pneumatic tube installation according to the invention with the known installation described above shows above all a considerable saving (around 50%) in the tube system and a reduction to one only in the number of blowers required.

According to the invention one sample despatch station and one sample receiving station are interconnected by a single delivery tube, as a consequence of which these stations may also be simplified in their construction because there is now no longer any need for the despatch and receiving stations required for the second delivery tube in the known installations.

Moreover, two non-return valves installed in the tube provide for reliable delivery both in the vacuum mode and also in the pressure mode of the blower.

In one particularly advantageous embodiment of the invention, the blower is associated with one station (preferably the sample receiving station) and the first non-return valve is installed in the tube section linking the two stations in the vicinity of the other station (preferably the sample despatch station), while the second non-return valve is arranged at that end of the tube which projects beyond this last station. In such an arrangement the first non-return valve closes and the second non-return valve opens in the vacuum mode, while the first non-return valve opens and the second non-return valve closes in the compressed-air mode. Accordingly, when an empty sample carrier is delivered from the sample receiving station to the sample despatch station, for example with the blower operating in the pressure mode, this sample carrier is initially delivered at full speed up to the first non-return valve, after which it is rapidly decelerated under the effect of the closed, second non-return valve (and the air cushion thus formed), so that the sample carrier makes a damped entry into the sample receiving station. Vacuum delivery in the opposite direction (i.e., for filled sample carriers) takes place in the same way.

In order to be able to carry out automatically the various working operations with the sample carriers at each station, it is known from the installations described above that a swivel arm can be swung back and forth through four working positions in each station.

By contrast, it is sufficient in the installation according to the invention, particularly by virtue of the single delivery tube, for at least the swivel arm provided in the despatch station to be arranged to swivel into three different positions, namely "despatch and receive", "open and close" and "fill" the sample carriers. In addition, the installation provides for automatic emptying of the contents of a carrier.

In another particularly advantageous embodiment of the invention, a Maltese Cross drive is associated with each swivel arm in the despatch and receiving stations, position indicators being provided for each working position of the Maltese Cross. This enables the swivel arm to be very accurately positioned in its working positions, the particular working operation only being able to be initiated on receipt of corresponding signals from the position indicators.

In another advantageous embodiment of the invention, pneumatic raisable and lowerable tube seals for sealing off the corresponding tubes against air and dust are provided both at the despatch and receiving position of each station and also at the carrier filling position.

As already mentioned, the sample despatch station is generally arranged below a sample mixer, being connected to the outlet of this sample mixer through a filling tube terminating at the carrier filling position. In an embodiment such as this, it is also favourable, in accordance with the invention, for the upper end of the filling tube to be situated with its opening below the mixer outlet and to be closeable by a pneumatically operable metering slide provided with a stripping element, and for a second pneumatically operable metering slide to be provided in the filling tube over the carrier filling position. In this way, a consistently equal and exact quantity of sample can be measured out for introduction into a waiting sample carrier.

If, in addition, the metering slide associated with the upper end of the filling tube is controllable in such a way that it only opens after a predetermined delay, it is possible to ensure that residues of old sample material do not adulterate a new sample.

DESCRIPTION OF THE DRAWINGS

The invention is described in more detail in the following with reference to the accompanying diagrammatic drawings, wherein:

FIG. 2 is a highly simplified front elevation of the sample despatch station of the pneumatic tube installation according to the invention;

FIG. 3 is a plan view of the sample despatch station shown in FIG. 2;

DESCRIPTION OF THE PREFERRED EMBODIMENTS

Figure 1:
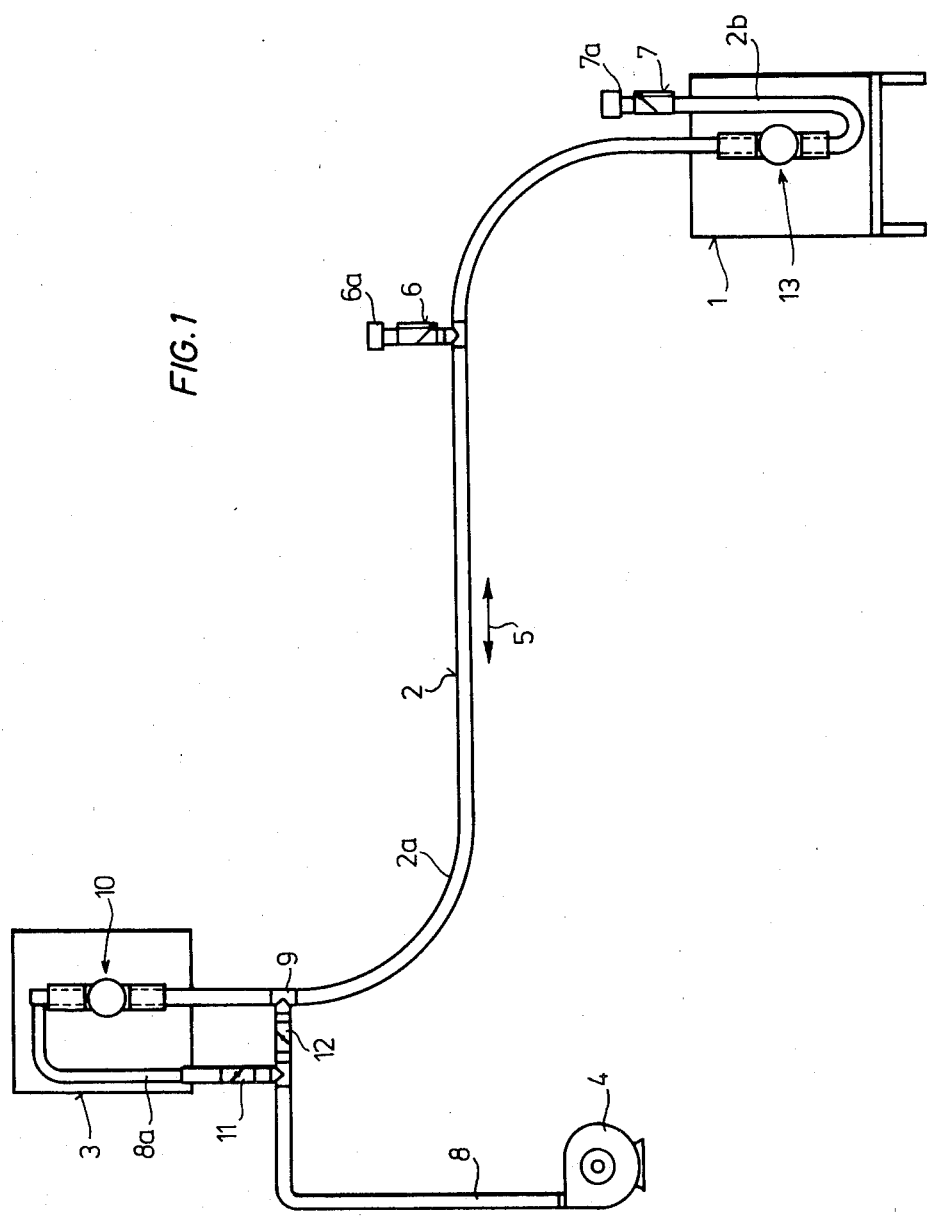
FIG. 1 is a simplified overall view of a pneumatic tube installation according to the invention.

FIG. 1 is a highly simplified view of the composition of a pneumatic tube installation according to the invention for posting samples of fine material. The installation contains a sample despatch station 1 set up in a production plant (and therefore hereinafter referred to in short as the factory station), a single delivery tube 2 forming the tube system, and a sample receiving station 3 which is set up at the sample processing or evaluating facility, i.e., preferably in a laboratory, and which therefore is hereinafter referred to in short as the laboratory station. The delivery tube 2 connects corresponding ends of the factory station 1 and the laboratory station 3 and is used both for transporting filled sample carriers from the factory station 1 to the laboratory station 3 and also for returning empty sample carriers from the laboratory station 3 to the factory station 1. To this end, the delivery tube 2 is supplied with delivery air by a single delivery blower 4 which can be changed over from vacuum delivery to pressure delivery. In order to enable the installation to operate reliably in these two modes (i.e., delivery in both directions, as indicated by the double arrow 5), first and second non-return valves 6 and 7 are provided for the delivery tube 2, their exact functions being described hereinafter.

As is apparent from FIG. 1, the actual delivery section 2a of the delivery tube (i.e., that section of the delivery tube which directly links the despatch and receiving positions of the factory station 1 and the laboratory station 3 for the delivery of sample carriers) is connected from below to the laboratory station 3, in the present case substantially vertically, the air conduit 8 coming from the blower 4 being on the one hand connected by a branch to the delivery section 2a through a T-coupling 9 below the laboratory station 3 and, on the other hand, connected by a branch 8a to that end of the despatch and receiving station remote from the end of the latter joined to the tube section 2a. In addition, adjustable throttle valves 11, 12 are respectively provided in the branch line 8a and in the region between the branching point and the T-coupling 9.

The blower 4 is associated with the laboratory station 3, i.e., it is arranged in the vicinity of this laboratory station or inside the laboratory station. In general, it would of course also be possible to associate the blower (with the corresponding air line sections and throttle valves) with the factory station 1. However, the arrangement shown in the drawing is preferred because it enables several factory stations to be associated with one laboratory station without any need for further blowers to be provided. In this case, the delivery tube 2 would communicate with branch lines leading to each additional factory station.

With further regard to the embodiment shown by way of example in FIG. 1, the first non-return valve 6 is installed in the actual delivery section 2a of the delivery tube 2 (i.e., in that section of the delivery tube which links the two stations 1 and 2) in the vicinity of the factory station 1. By contrast, the second non-return valve 7 is arranged at that end 2b of the delivery tube 2 remote from the tube 2 and which extends beyond the despatch and receiving position 13 of the factory station 1. Both non-return valves 6 and 7 communicate with the surrounding atmosphere, preferably through directly installed filters 6a and 7a. The construction and arrangement of the two non-return valves 6 and 7 are such that, when the pneumatic tube installation is operating in the vacuum mode, the first non-return valve 6 closes and the second non-return valve 7 opens, whereas in the pressure mode the first non-return valve 6 opens and the second non-return valve 7 closes.

Pneumatic tube installation as described thus far operates as follows:

When a filled sample carrier is to be delivered from the factory station 1 to the laboratory station 3, the delivery blower 4 is switched to operate in the vacuum mode, the second non-return valve 7 and the throttle valve 12 opening and the first non-return valve 6 and the throttle valve 11 closing (in each case automatically) after the blower has been switched on. A sample carrier introduced at the despatch and receiving position 13 of the factory station 1 is then delivered in the vacuum mode to the despatch and receiving position 10 of the laboratory station 3. On approaching the laboratory station 3, the sample carrier is decelerated by the corresponding setting of the throttle valves 11 and 12 in the air-line 8, 8a (under the effect of the air cushion formed). The blower 4 is not switched off until the arriving sample carrier has been received in the despatch and receiving position 10 (in the manner explained hereinafter).

If, conversely, an empty sample carrier is to be returned from the laboratory station 3 to the factory station 1, the blower 4 is switched over to the pressure mode. However, the blower 4 is preferably switched on only after the empty transport carrier introduced at the despatch and receiving position 10 of the laboratory station 3 has dropped down and passed the T-coupling 9. In the pressure mode, the first non-return valve 6 is automatically opened while the second non-return valve 7 closes. The sample carrier then travels at full speed up to the first non-return valve 6, after which it is rapidly decelerated because the rest of the delivery tube section is completely closed off by the second non-return valve 7 and by tube seals which will be described hereinafter. The sample carrier is thus able to make a damped entry into the factory station 1 where it is received at the despatch and receiving position 13.

To enable the various working operations with the sample carriers to be carried out automatically at one of the above-mentioned stations, each station contains a swivel arm arranged to swivel back and forth through several positions.

The arrangement of such a swivel arm, particularly in conjunction with the factory station 1, is illustrated in detail in FIGS. 2, 3, and 8-12. FIGS. 2 and 3 (front elevation and plan views, respectively) show the despatch and receiving position 13 at the right-hand side of the station. The swivel arm is denoted by the reference 14. At one end 14a the swivel arm 14 is fixedly mounted on a hollow shaft 15 arranged perpendicularly in the region of its centre and, under the control of this hollow shaft 15, can be swivelled horizontally in the direction of the arrows 16, 16a. The upper and lower ends of the hollow shaft 15 are respectively mounted for rotation in dust-tight roller bearings (preferably tapered roller bearings) 17, 17a. In this embodiment of the invention, the swivel arm 14 can be swivelled into three different positions in which the "despatch and receive", "open and close" and "fill" operations can be carried out. In other words the factory station 1 contains the already mentioned despatch and receiving position 13, an opening and closing position 18 (central position of the swivel arm) and a filling position 19 situated on the left-hand side of the station 1.

When therefore an empty sample carrier is delivered to the factory station 1, it arrives at the despatch and receiving position 13 where of course the swivel arm 14 is situated, the arriving sample carrier being held in the arm 14 by pincers hereinafter to be described. The swivel arm 14 then swivels into the opening and closing position 18 in which the sample carrier is automatically opened, as will be explained, after which the swivel arm 14 swivels the sample carrier into the filling position 19 in which it is filled. After filling, the swivel arm 14 automatically swivels back into the opening and closing position 18 in which the sample carrier is automatically reclosed, after which the swivel arm 14 returns the filled and closed sample carrier to the despatch and receiving position 13 from which it is delivered to the laboratory station 3 in the manner described above.

Another swivel arm is of course similarly arranged in the laboratory station 3, but with the differences that an emptying position is provided in place of the filling position 19 of the station 1 and, in addition, provision is made in the usual way for completely cleaning the emptied carrier (which may be carried out either at a separate cleaning position or, for example, simultaneously in the emptying position). So far as the construction of the swivel arm arranged in the laboratory station 3 is concerned, it is further pointed out that its front end (which takes up the carrier) is capable of swiveling on its own axis through approximately 180°, so that the contents of the opened sample carrier can be automatically tipped out in the emptying position.

Figure 4:
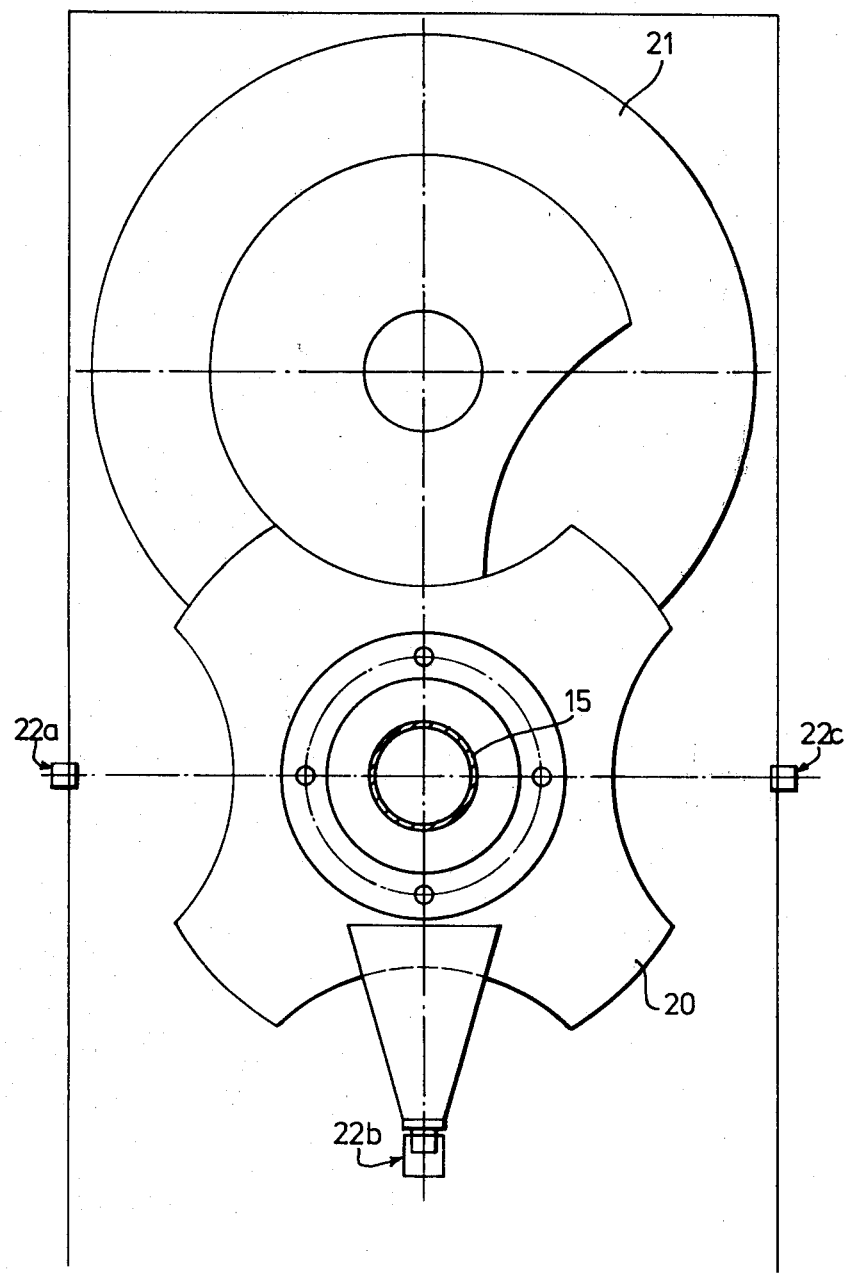
FIG. 4 shows a Maltese Cross drive for the swivelling movement of a swivel arm used in a station.

In either case, however, it is of importance both to the swivel arm 14 arranged in the factory station 1 and also to the swivel arm provided in the laboratory station 3 that it can be swivelled into its working positions with considerable precision. To this end, a Maltese Cross drive 20 is associated with each swivel arm, as shown in FIG. 4, and position indicators are provided for each working position of the Maltese Cross 20 and hence of the associated swivel arm. The Maltese Cross 20 is driven by means of a rotating field magnet geared motor 21.

The embodiment of a Maltese Cross drive shown in FIG. 4 is mounted on the hollow shaft 15 of the swivel arm 14 of the factory station 1 (cf. FIGS. 2 and 3). Since, as explained above, the swivel arm 14 of the factory station 1 can be swivelled back and forth through three positions, three position indicators, in the form of initiators 22a, 22b and 22c, are accordingly associated with the Maltese Cross 20 at corresponding points. Corresponding position signals are delivered to the associated control system through these initiators 22a to 22c.

The use of a Maltese Cross drive (20, 21) provides for extremely accurate positioning of the swivel arms of the factory station 1 and the laboratory station 3 in their various working positions. By virtue of the geared motor 21 used and the torque provided, the swivel arm can be stopped without difficulty by manual intervention in the event of jamming. In addition, the geared motor can be operated under permanent load in the event of jamming. By virtue of the Maltese Cross drive, the swivel arm is given a speed of movement which is substantially sinusoidal in the respect that the particular working positions are approached at a relatively low speed while the speed of movement in the intermediate positions is higher. In that case, position control is effected by the above-mentioned initiators 22a to 22c which are preferably in the form of known proximity initiators.

Figure 5:
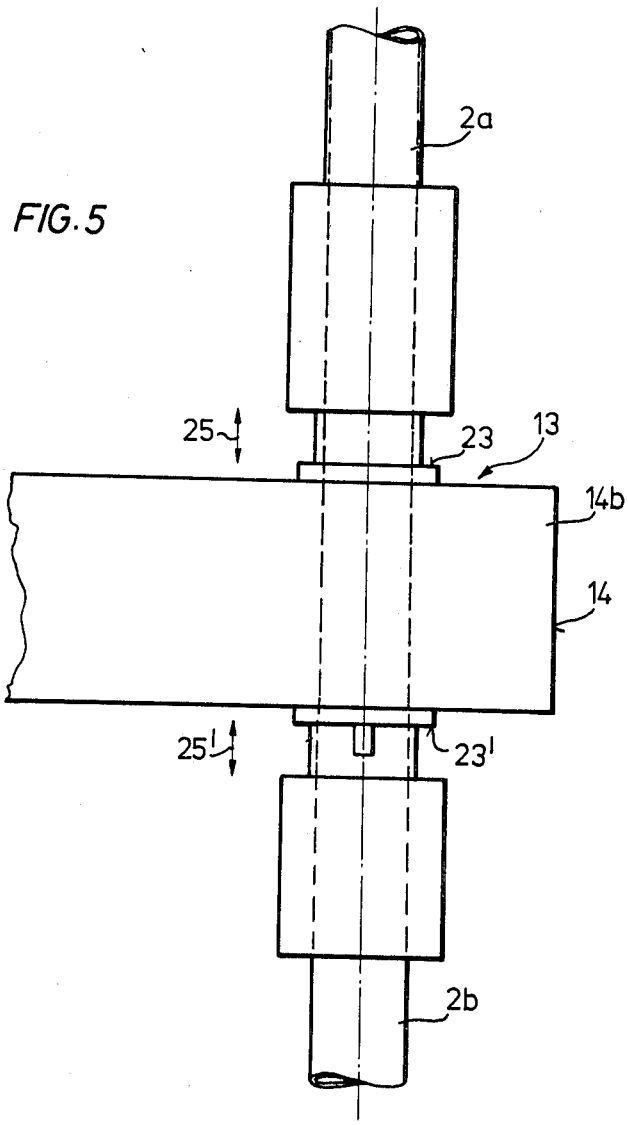
FIG. 5 is a partial elevation of the despatch and receiving position of a station with the swivel arm retracted.
Figure 6:
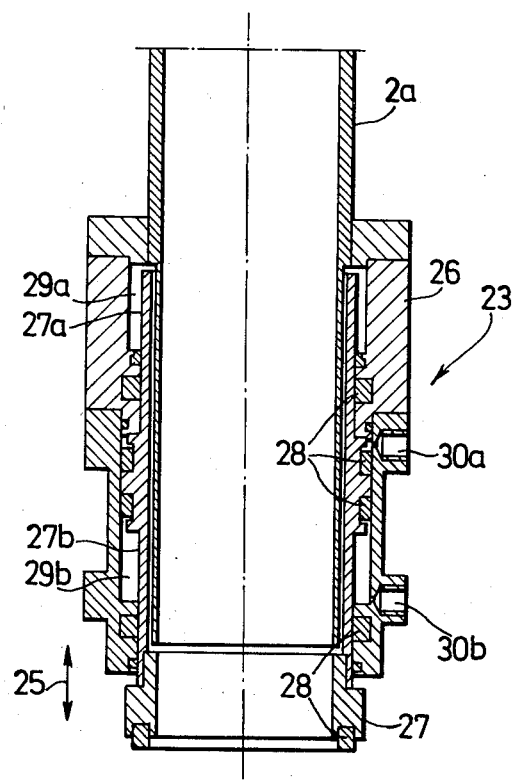
FIG. 6 is a longitudinal section through a tube seal of the type used at the despatch and receiving position and at the carrier filling position of a station.

In a pneumatic tube installation of the type disclosed, another important factor is that both the despatch and receiving positions of the individual stations and also the filling position of the factory station 1 are properly sealed off in order on the one hand to ensure reliable delivery and, on the other hand, to obtain thorough dust-proofing. A particularly advantageous and reliable tube seal is described with reference to FIGS. 5 to 7 (particularly FIG. 6). Whereas, as shown in FIG. 5, pneumatic seals 23 and 23' (arranged in mirror-image symmetry to one another) are provided in the despatch and receiving position 13 (both for the factory station 1 and also for the laboratory station 3) above and below that end 14b of the swivel arm 14 which takes up and releases a sample carrier, a single, upper pneumatic seal 23'', which may also assume the form shown in FIG. 6, is sufficient for the filling position 19 of the factory station 1, being arranged at the lower end 24a of a filling tube 24 which will be described hereinafter. These tube seals 23, 23' and 23'' are adapted to be pneumatically raised and lowered in the direction of the double arrows 25, 25' 25'' in order, on the one hand, to enable the swivel arm 14 to be hermetically sealed off from the corresponding delivery tube sections 2a, 2b and, on the other hand, to obtain a dust-tight seal between the end 24a of the filling tube and the retracted swivel arm 14 (during the filling of a sample carrier).

As can be seen from FIG. 6, a pneumatic tube seal 23 (and similarly the seals 23' and 23'') essentially comprises a tubular section 26 fixedly connected to the corresponding tube section, for example 2a, and an inner tubular section 27 which is slidingly received (in the direction of the double arrow 25) in and sealed off from the tubular section 26. Several suitable ring seals 28, preferably Simmer rings, are inserted at corresponding points between these two sections 26 and 27. The outer peripheral sides 27a, 27b of the inner sealing section 27, which are in sliding engagement with corresponding inner peripheral sections (sealing sections) of the outer sealing section 26, are in the form of lapped, chromium plated sliding surfaces, providing for satisfactory axial low-friction guiding. Chambers designed to receive compressed air (as indicated for example at 29a and 29b) are provided in the vicinity of these sliding contact zones 27a and 27b, communicating with compressed air connections 30a and 30b of which the upper compressed air connection 30a for example is adapted to receive compressed air for lowering the seal 23 (or its section 27), while the lower compressed air connection 30b is fed with compressed air for raising the seal. When the seal is engaged, the sealing ring 28 projecting axially from the free end, in this case the lower end, of the sealing section 27 is firmly applied to the facing axial peripheral surface of the swivel arm.

As mentioned above, the factory station 1 serving as the sample despatch station is preferably situated below a sample mixer known per se (not shown in detail), with whose outlet the factory station 1 communicates through the filling tube 24 terminating at the carrier filling position 19 (cf. FIG. 7). The upper end 24b of the filling tube 24 lies with its opening below the mixer outlet 31, projecting from below into the outlet tube 31a of this mixer outlet. The opening of the upper end 24b of the filling tube is normally closed by a pneumatically operable metering slide 32. In this case, the slide is in the form of a segment slide so that it closes the outlet tube 31a reliably and safely, even if it is full, and at the same time acts as a stripping element by pushing away the sample material. The metering slide 32 is open and closed by means of a pneumatic cylinder 33 (not shown in detail) which is time-controlled in such a way that the metering slide 32 only opens the upper end 24b of the filling tube after a predetermined delay to ensure that the new sample is not adulterated by residues of old sample material. The excess sample material is removed from the outlet tube 31a in the direction of the arrow 31b.

Figure 7:
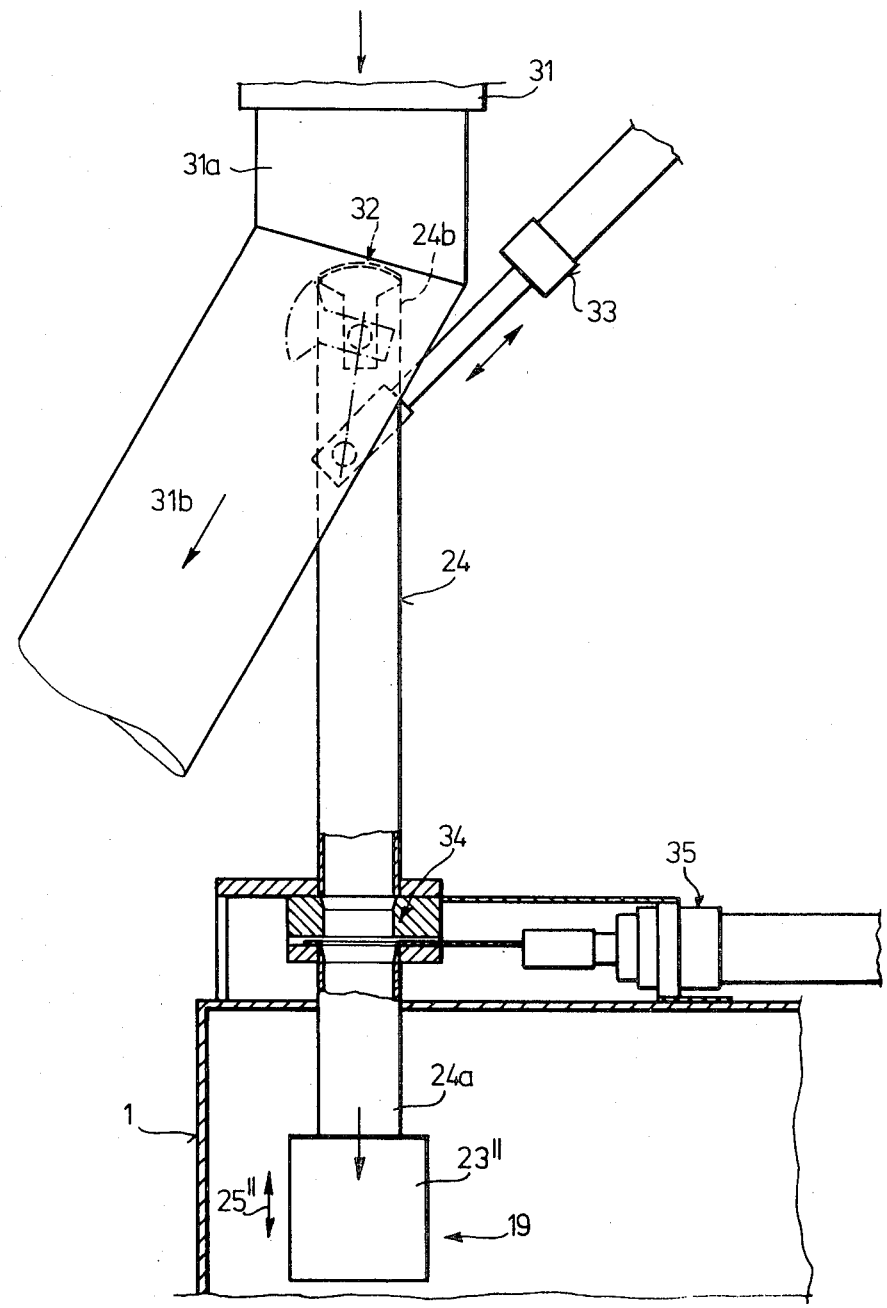
FIG. 7 is partial elevation of a sample despatch station with the filling tube connected to the carrier filling position.

In the filling tube 24 shown in FIG. 7, a second pneumatically operable metering slide 34 is provided over the carrier filling position 19 for accurately measuring the amount of sample to be introduced into a sample carrier. This second metering slide 34 is preferably in the form of a flat slide and is operated in the required manner by a pneumatic control cylinder 35. In the illustrated embodiment, this second metering slide 34 is arranged on the housing of the factory station 1, although it may of course be equally well accommodated inside the station 1.

A sample carrier adapted for use with the present invention is indicated generally by the reference character 50 and is of known construction. The carrier is hollow having a closed bottom 50a and normally is closed at its top by a removable flanged cap 51. The carrier has longitudinally spaced, external guide rings 50b and 50c.

Figure 8:
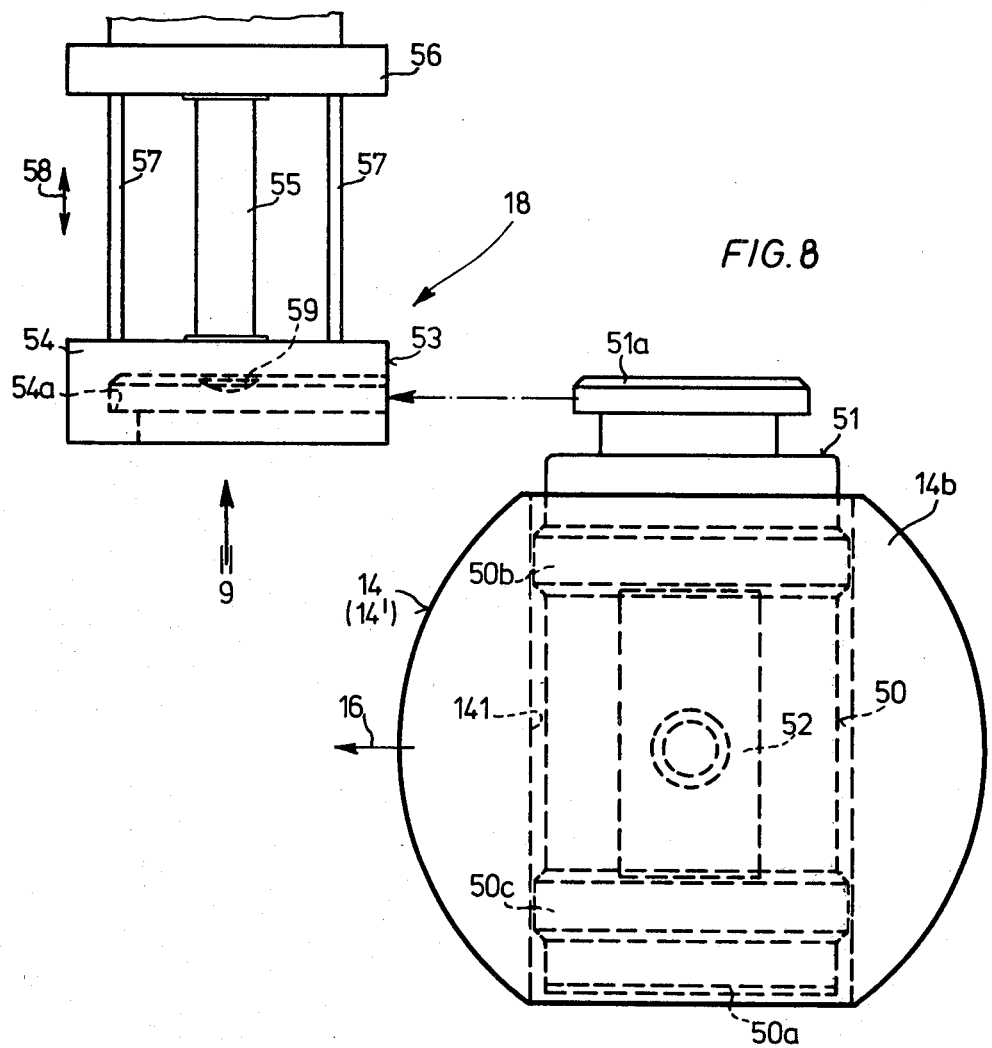
FIG. 8 is a simplified front elevational view of part of the apparatus shown in FIG. 2, and illustrating movement of the swivel arm toward the carrier opening and closing position.
Figure 9:
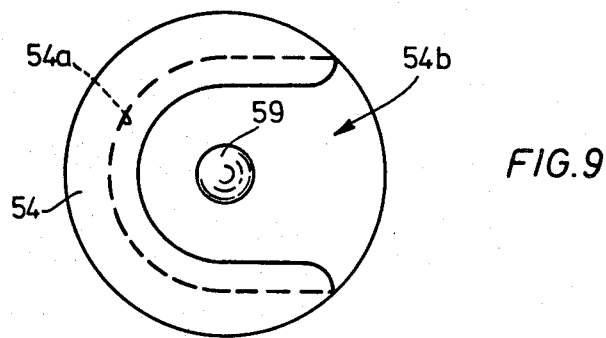
FIG. 9 is a bottom plan view of one end of the swivel arm as viewed in the direction of the arrow 9 in FIG. 8.
Figure 10:
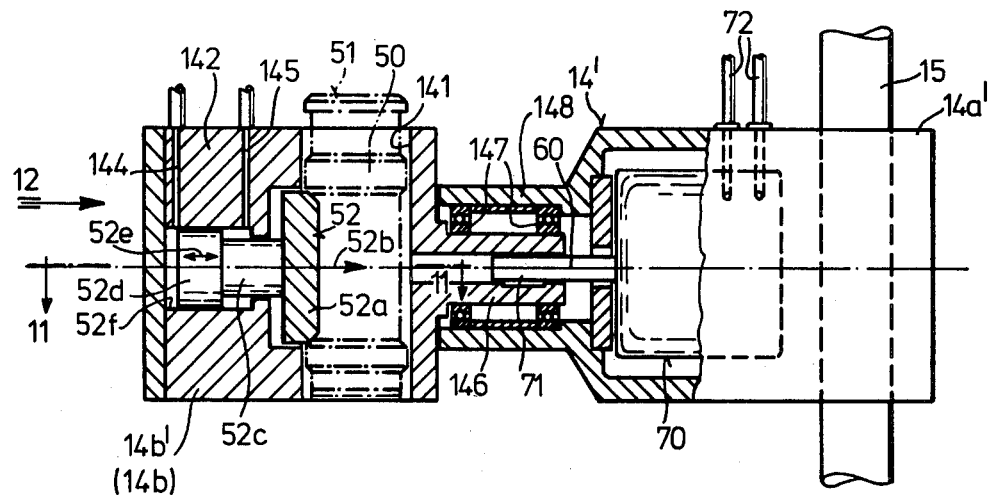
FIG. 10 is a view partly in side elevation and partly in section illustrating the swivel arm.
Figure 11:
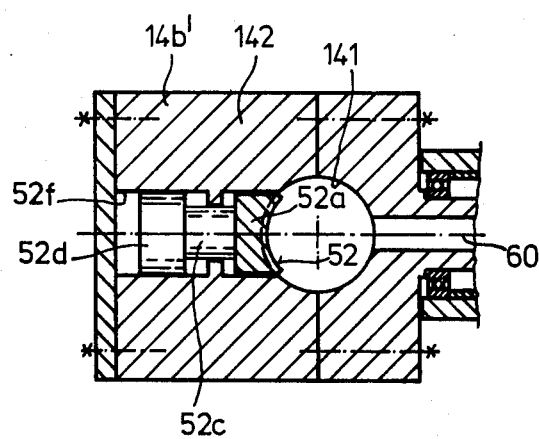
FIG. 11 is a cross-sectional view taken on the line 11—11 of FIG. 10.

Each of the swivel arms 14 has adjacent its free end 14b a throughbore 141 for receiving a sample carrier as is shown in chain lines in FIGS. 8 and 10. Mounted between the bore 141 and the free end of the arm is a pincer 52 having a concave surface 52a confronting the bore 141. The pincer is arranged to bear against the carrier 50 between the guide rings 50b, 50c, thereby clamping the carrier in the bore 141.

The pincer includes a piston rod 52c that extends from a double acting piston 52d which is reciprocable in a cylinder 52f in the directions of the double arrow 52e. Actuating fluid (preferably air) may be supplied to the cylinder 52f via conduits 144 and 145 to effect reciprocation of the piston and retention of the latter at either end of its stroke.

At each of the factory and laboratory stations 2 and 3, respectively, claw means is provided for automatically removing the cap 51 from the carrier 50 and returning the cap to the carrier. The claw means is designated entirely by the reference character 53 and comprises a body 54 having in its lower surface a recess 54a corresponding in configuration to that of the head 51a of the cap 51a. The recess 54b is open at one side so as to permit the cap head 51a to be accommodated in the recess when the swivel arm is swung to the filling position 19 at the factory station and to the opening and closing position at the laboratory station. Following movement of the head 51a of the cap 51 into the recess 54b a pneumatic cylinder 56 having a reciprocable piston rod 55 connected to the body 54 is actuated to raise the latter and remove the cap from the carrier 50. The body 54 is guided in its movements by guide rods 57 which reciprocate with the body.

To return a cap to a carrier, the ram 56 is actuated to move the body 54 toward the carrier, following which the swivel arm can be swung away from the claw to remove the cap head 51a from the recess 54b.

To compensate for differences which sometimes may be present between different cap heads 51a, an outwardly convex spring 59 is secured at the base of the recess 54b to bear against the cap and maintain the latter in a fixed position relative to the claw, thereby ensuring that a cap removed from a carrier may be returned to the latter.

To ensure wholly automatic operation in the handling of the carrier at the laboratory station 3, it not only is necessary that the carrier be opened and reclosed automatically, as at the factory station, but also that the contents of the carrier may be discharged. This objective may be achieved by substituting for the integral swivel arm 14 an arm 14' having two separate portions 14a' and 14b', the free end portion 14b' being rotatable about its own horizontal axis 60 through 180°. In this construction the free end portion 14b' of the swivel arm has a hollow extension 146 that is keyed to a driving axle 71 of a rotable drive member 70 accommodated in a chamber formed in the end portion 14a' of the swivel arm 14'. The extension 146 is journaled by bearings 147 in a tubular extension 148 carried by the end portion 14a'. The drive member 70 is a pneumatically rotatable cylinder to which fluid is supplied by conduits 72 so as to rotate the axle 71 first in one direction and then in the other, as indicated by the double arrow 61 in FIG. 12.

Figure 12:
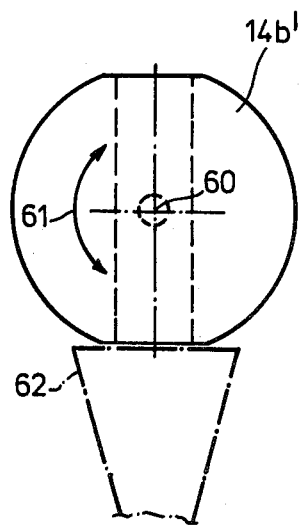
FIG. 12 is an end elevation of the swivel arm as viewed in the direction of the arrow 12 in FIG. 11.

When the free end portion 14b' of the swivel arm 14' is rotated through 180° from the upright position shown in FIG. 10 to the position shown in FIG. 12, the contents of the open carrier 50 will be deposited into a receiving container 62 supported at the laboratory station below the end portion 14b'.

During the emptying of the contents of a carrier 50 at the laboratory station, the arm portion 14b may be rocked between its upright and upsidedown positions several times. Further, the rotor 70 may engage a stop when it has been rotated to the upsidedown position of the carrier to provide a sudden stopping of the arm portion 14b and facilitate the full discharge of the contents of the carrier 50.

It will be understood that a swivel arm 14' may be used at both of the factory and laboratory stations, but since it is not normally necessary to upend the carrier at the factory station, the expense of providing a swivelable and rotatable arm can be dispensed with at the factory station.

Finally, it is pointed out that the pneumatic tube installation according to the invention also contains a suitable overall control system which may be designed in the usual way and, for this reason, has not been described in detail. In addition, the automatic pneumatic tube installation according to the invention is of course synchronised fully automatically so that, after maintenance work, the installation can be automatically returned to its starting position.

We claim:

1. In an installation for automatically posting a sample carrier between at least one dispatch station and a receiving station, said installation comprising pneumatic tube means communicating at one end with one end of one of said stations and at its opposite end with one end of the other of said stations and through which tube means said carrier may travel between said dispatch station and said receiving station, and air blower means coupled to said tube means and operable to effect movement of said carrier through said tube means, the improvement comprising carrier support means at least at one of said stations and having an opening therein for the accommodation of said carrier; means mounting said support means for movements between a plurality of positions at said one of said stations; driving means for moving said support means between said positions in one of which said opening is aligned with said tube means; sealing means for effecting a seal between said tube means and said support means when the latter is in said one of said positions; means for adjusting said sealing means to break said seal prior to movement of said support means from said one of said positions to another; clamp means carried by said support means; and means for moving said clamp means into engagement with said one of said carriers prior to movement of said support means from said one of said positions.

2. An installation according to claim 1 wherein said one of said stations is said receiving station.

3. An installation according to claim 1 wherein said driving means comprises a maltese cross and a rotating field magnet geared motor.

4. An installation according to claim 1 wherein said adjusting means is pneumatic.

5. An installation according to claim 1 wherein said one of said stations is said despatch station and wherein a sample mixer has a filling tube extending downwardly to a position to fill a carrier supported by said support means; a first slide for opening and closing said filling tube adjacent its upper end; and a second slide for opening and closing said filling tube at a position lower than said first slide.

6. An installation according to claim 5 including operating means for moving said slides between open and closed positions, said first slide being movable by its operating means to its open position following movement of said second slide by its operating means to its open position.

* * * * *